United States Patent
Mevissen

[11] 3,722,895
[45] Mar. 27, 1973

[54] SEALING DEVICE

[75] Inventor: Ernst A. Mevissen, Robinson Township, Allegheny Cty., Pa.

[73] Assignee: Dravo Corporation, Pittsburgh, Pa.

[22] Filed: Dec. 30, 1970

[21] Appl. No.: 102,831

[52] U.S. Cl. ............................... 277/34.3, 277/34.6
[51] Int. Cl. ............................................. F16j 15/46
[58] Field of Search .277/3, 5, 34, 34.3, 34.6, 72 FM, 277/147, 165; 166/187

[56] References Cited

UNITED STATES PATENTS

| | | | |
|---|---|---|---|
| 3,365,186 | 1/1968 | Bosetti et al. | 266/34 T |
| 3,294,243 | 12/1966 | Cerles | 277/34.3 X |
| 3,337,222 | 8/1967 | Smith et al. | 277/34.3 |
| 3,503,445 | 3/1970 | Cochrum et al. | 166/187 X |
| 3,514,115 | 5/1970 | Gallo | 277/34.3 |

Primary Examiner—Meyer Perlin
Assistant Examiner—Ronald C. Capossela
Attorney—Parmelee, Utzler & Welsh

[57] ABSTRACT

A device for providing a sealed contact between two metal telescoping members is disclosed. One of the members has an annular packing-receiving channel secured thereon. An expansible tubular annulus forming part of the sealing device is entirely contained in the channel. Fluid pressure means is provided for selectively supplying fluid under pressure to the annulus and for relieving the fluid pressure therein. A replaceable radially yieldable elastic annular seal member is fitted in the channel around the expansible tubular annulus and has its radial outer peripheral surface projecting from the channel toward the confronting surface of the other member. The outer peripheral surface of the seal member has a sealing surface thereon for contacting the confronting surface of the other member when the tubular annulus is expanded.

13 Claims, 3 Drawing Figures

Patented March 27, 1973  3,722,895
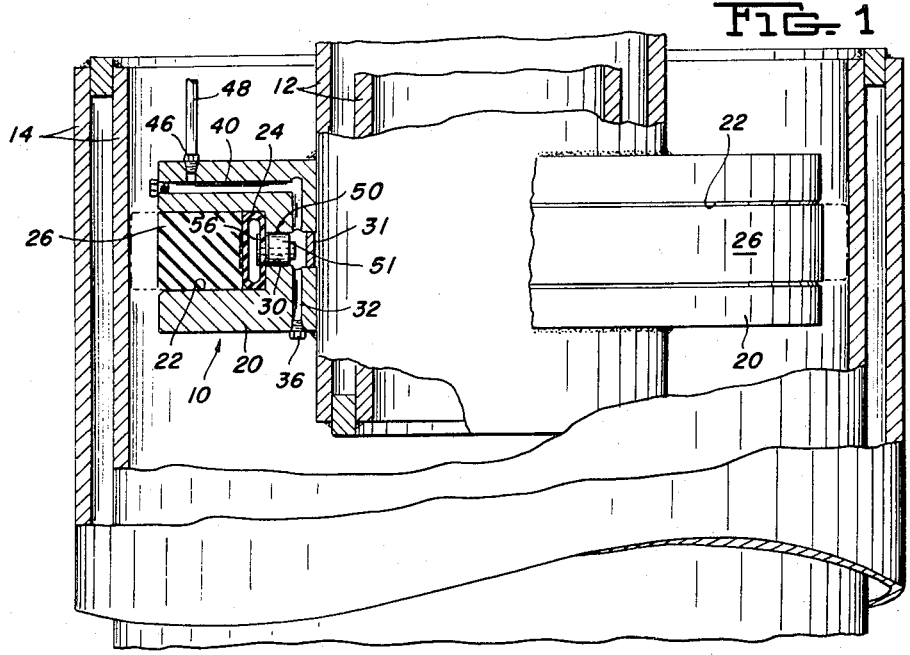
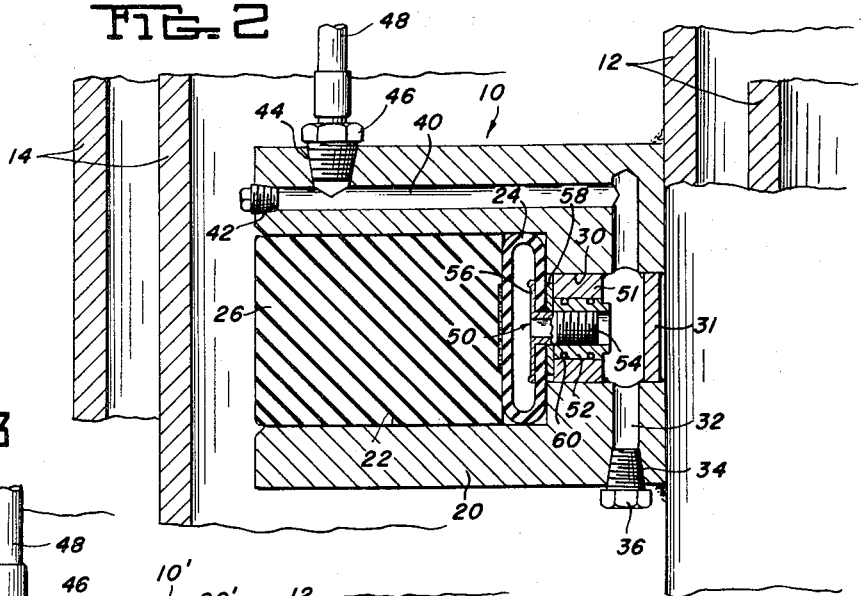
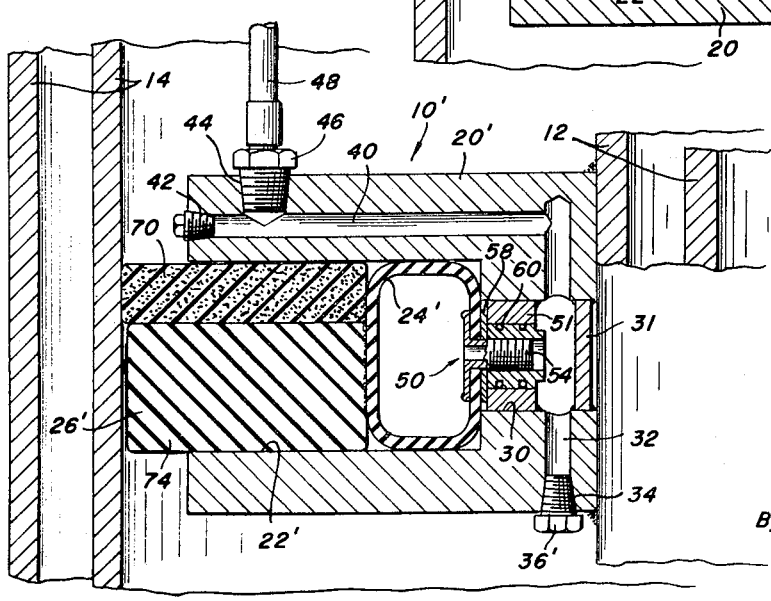
INVENTOR
ERNST A. MEVISSEN
By Parmelee, Utzler & Welsh
his Attorneys

SEALING DEVICE

This invention relates to a sealing device for use between two members, such as two metal concentric telescoping members, as would be used in a vacuum degassing apparatus, for example.

In various industrial apparatus fluid tight seals are required between relatively movable inner and outer ducts or other members. Because of the size of the members and also because of the need to controllably release the seal in order to effect the required relative movement between the two members, conventional packing rings and glands as are commonly used in smaller apparatus are not suited to this purpose. For example, as disclosed in U. S. Pat. No. 3,365,186 to Bosetti, et al. which is assigned to the asignee of the present invention, the exhaust duct of a molten steel vacuum degassing unit is telescopically connected to an exhaust line leading to a vacuum pump. The telescopic connection permits the degassing unit to be raised or lowered with respect to a ladle containing the molten steel to be degassed. A seal is provided between the confronting surfaces of the concentric parts of the telescoping joint which must be capable of effectively preventing the influx of ambient air into the degassing system when a high degree of vacuum is being pulled on the degassing vessel. At the same time this seal must be capable of rapidly releasing one part for relative movement of one duct with respect to the other when the degassing unit is to be raised or lowered between the degassing of successive heats of steel or at other times when no vacuum is required in the duct system.

At the present time there is provided on one of the two confronting surfaces of one of the two telescoping ducts a metal channel in which is retained an inflatable rubber annulus, resembling roughly a bicycle tire of large proportions, connected with an air supply line. When there is no pressure in the annulus it is collapsed and is ineffective as a seal. At that time it offers no resistance to relative sliding or rotating motion between the telescopic duct sections. When the sealing function is required, air under pressure is supplied from an air line to the rubber annulus, pumping it up so that its rim portion, corresponding to the tread of a tire bulges or expands against the confronting surface of the other member of the joint to form a pressure tight seal. While the annulus is expanded in this manner, relative movement of the parts will most likely break or bruise or otherwise damage the inflatable annulus so that it may not thereafter be used, or at the very least rapidly wear away its rubber rim, and the air should at all times be exhausted from the annulus before relative motion between the parts is attempted. Unfortunately attempts, either by accident or intent, are made to effect relative movement of the ducts without the annulus being adequately collapsed, and the replacement of the annulus, as well as loss of production through downtime of the apparatus, are substantial items of expense in this and other equipment to which like seals are applied. It has also been found that the seals tend to lose their elasticity in time and do not return to their neutral position when pressure is relieved. The loss of elasticity of the old inflatable seals is attributed to their overall weakness in structure. A problem also arises with the old type seals when the inner duct has vacuum still drawn on it and the seal is retracted. Under these conditions the large pressure differential across the seal will force the seal out of its housing and/or possibly damage it.

I overcome the above problems by providing a strong sealing device which provides an effective seal between two telescoping members while resisting collapse under pressure and having a longer effective life, further having a sealing surface considerably less expensive to replace than the heretofore used inflatable seal, as described above. More particularly, my sealing device, preferably, comprises: an expansible annulus contained within the channel of an annular packing-receiving member of one of telescopically positioned inner and outer members; fluid pressure means for selectively supplying fluid under pressure to the annulus and for relieving fluid pressure therein; and a radially yieldable elastic annular sealing member fitted in the channel around the expansible annulus and having its radial outer peripheral surface projecting from the channel toward the confronting surface of the other member, the outer peripheral surface having a sealing surface for contacting the confronting surface when the annulus is expanded. The sealing member is preferably made from a material having sufficient elasticity to return to its initial position after the pressure is relieved in the annulus. In addition, the annular seal member may be made detachable from the expansible annulus and thus, would only have to be replaced without having to replace the inflatable annulus. Replacing the outer seal member would be considerably easier and less expensive than having to replace the entire inflatable type seal as was formerly the case. Also, my seal has the capability of being simply modified to provide additional favorable characteristics over the old seal. For example, the annular seal member could be formed of a pair of concentric axially abutting rings, one of the rings providing the actual sealing surface and the other being stronger than the seal ring to provide additional support to the assembly and thereby serve to offer greater resistance to the surrounding pressure acting on the seal. In addition to providing increased strength, the double ring assembly permits use of a thinner ring, as compared with the single ring assembly, for providing the sealing contact and reduces replacement cost even more. In this case the support ring would be sized to extend to adjacent the contacting surface and thus would not be subject to damage during relative movement of the concentric members.

Other details and advantages of the invention will become apparent as the following descriptions of certain present preferred embodiments thereof proceed.

In the accompanying drawings I have shown certain present embodiments of the invention in which:

FIG. 1 is a fragmentary longitudinal view partially in section through two concentric telescoping tubes as would used in a vacuum degassing apparatus, for example, showing a sealing device embodying one form of the present invention mounted on the inner tube and in its neutral position;

FIG. 2 is an enlarged view similar to that of FIG. 1 showing the sealing device in its neutral position and in sealing engagement with the inner wall of the outer tube, respectively; and FIG. 3 is a fragmentary longitudinal sectional view through two concentric telescoping tubes showing a sealing device embodying another form of the present invention mounted on the inner tube.

Referring now to the drawings, and particularly to FIGS. 1 and 2, there is shown a sealing device embodying the present invention and generally designated by the numeral 10. The sealing device 10 is mounted on an outer wall portion of a fixed inner duct or tube 12 which is concentrically arranged within an outer duct or tube 14 supported to telescopically reciprocate with respect to the inner duct. As shown, tubes 12 and 14 are of a double walled construction to form passageways for circulation of a coolant passing through inlets and outlets, not shown. The arrangement of tubes 12 and 14 is typical of a vacuum line arrangement of apparatus for the vacuum degassing of molten metal in a ladle. However, it is emphasized that the sealing device of this invention is applicable for use with other apparatus, and that reference to vacuum degassing apparatus is merely as an example of one application and is not to be construed as limiting the invention to such apparatus.

Sealing device 10 includes an annular shaped housing 20 fixed to the inner tube 12. Housing 20 has an annular channel 22 formed therein with the radial outer end of the channel being open and facing a confronting section of the inner wall portion of outer tube 14. The inner radial end of channel 22 is closed except for a passageway sized to receive a valve sleeve assembly which will be more fully described hereinafter. An inflatable annulus 24 formed of yieldable elastic material, such as solid or fabric reinforced neoprene rubber, for example, is received in channel 22 and is sized and disposed such that the inner surface of the annulus abuts the inner wall of the channel and the axial upper and lower end surfaces abut opposite upper and lower wall surfaces, respectively, of the channel. An annular sealing member 26 formed of a yieldable elastic material, such as solid neoprene rubber, for example, is also received in channel 22, and is sized such that the radial inner end thereof abuts and is secured, as by vulcanizing or by a suitable adhesive, to the outer face of annulus 24, while the outer radial end is generally flush or recessed with respect to the outer end of the channel. The sealing member 26 and annulus 24 may also be made as an integral unit as by solid extrusion, for example. In addition, the sealing member 26 is sized to be received in channel 22 such that the seal member will be able to expand and contract radially outwardly and inwardly within the channel. Also, the elastic material selected for the sealing member 26 should be such as to allow the member to return to its original position after the expanding or sealing pressure is relieved. The radial outer peripheral surface of sealing member 26 defines a sealing surface projecting from channel 22 toward the confronting surface of the inner wall of outer tube 14. Housing 20, annulus 24 and sealing member 26 are sized such that when annulus 24 is inflated to be fully extended, the outer periphery of sealing member 26 is in sealing engagement or contact with the confronting surface of outer tube 14.

Fluid pressure means are provided for selectively supplying fluid under pressure to annulus 24 and also for relieving the pressure or drawing a vacuum in the annulus. As shown, housing 20 has a radially extending passageway 30 communicating at one end with channel 22 and extending through the radial inner end of the housing. A disc member 31 closes the end of passageway 30 and is secured to the housing 20 by welding or other suitable means. Passageway 30 is intersected at an intermediate portion thereof by an axially extending bore 32. Bore 32 extends to a port 34 at the lower end of housing 20, which port is shaped for receiving a threaded plug 36. The opposite end of bore 32 terminates within housing 20 and communicates with radially extending bore 40, which in turn terminates in a port 42 in the outer radial end of the housing. Another port 44 is provided through the upper surface of housing 22 and intersects bore 40. Port 44 is shaped to receive a threaded fitting 46 coupled with a length of tubing 48 connected to a source of fluid pressure such as pressurized air and a vacuum source, both of which sources are not shown. Port 42 is suitably plugged. Pressurized air enters annulus 24 or vacuum is drawn on annulus 24 through valve assembly 50 disposed in passageway 30. A bushing 51 is secured in passageway 30 and is sized to receive the valve assembly 50 which includes a tubular cylindrically shaped sleeve 52 snugly and removably received in the bore of bushing 51, and an externally threaded tubular valve stem 54 received in the internally threaded bore of the sleeve. The outer end of the valve stem 54 is snugly received in an opening through annulus 24. A flange 56 is secured to the outer end (left end as viewed in FIGS. 1 and 2) of the valve stem 54 and is disposed within annulus 24 for securing the stem to the annulus 24. A disc 58 shaped similarly to flange 56 is arranged around valve stem 54 and abuts the side of the annulus 24 opposite the flange 56. Seal rings such as O-rings 60 are received in annular grooves extending around the outer periphery of sleeve 52, and are sized to sealably engage the wall of the bore of bushing 51 to thereby effect a seal between channel 22 and bores 32 and 40. Thus, when it is desired to effect a seal between inner and outer tubes 12 and 14, as when a vacuum is being drawn on the degassing unit, the pressurized air is turned on and annulus 24 is expanded urging sealing member 26 radially outwardly into sealing engagement with the inner wall of outer tube 14. When the pressurized air is turned off, the seal member 26 will return to its neutral position. A vacuum may be drawn on annulus 24 for restoring sealing member 26 if the sealing member for some reason is unable to spring back to its neutral position.

When annulus 24 is inflated, it engages the walls of channel 22, together with urging the sealing member 26 outwardly. By engaging the walls of channel 22, annulus 24 effects an additional seal between the vacuum and pressure sides of the telescoping tubes 12 and 14. The sealing effect of the inflated annulus 24 is significant when considering that the annular sealing member 26 decreases in cross-sectional size when it is expanded and could loosen within channel 22 and air would tend to flow between the seal member and the walls of channel 22. Such potential leakage of air is prevented by the increased sealing effect provided by the inflated annulus 24.

As noted earlier, the sealing member 26 is secured to the outer face of annulus 24, as by vulcanizing or with a suitable adhesive, for example. The securing means, whether by vulcanizing or using an adhesive or otherwise, should be preferably selected so that the sealing member 26 is detachable from the annulus 26 and thereby enable the sealing member 26 to be removed and replaced without need of replacing the annulus. However, the sealing member 26 may be integral with the annulus 24 if it is so desired. Such an integral arrangement is within the scope of this invention.

Another embodiment of the sealing device is shown in FIG. 3. The sealing device 10' of FIG. 3 is the same as that described above with respect to FIGS. 1 and 2, except that the outer sealing member of sealing device 10' has an upper ring member 70 and a lower ring member 74 axially abutting the upper ring. Both ring members 70 and 74 are formed from a yieldable elastic material with the lower ring member 74 having higher strength properties than the material used in forming upper ring member 70. Both ring members 70 and 74 have outer peripheral surfaces which project from the channel 22' of housing 20' towards the confronting surface of the outer tube 14. The upper ring member 70 is the sealing ring and has an outer diameter greater than and is thinner than the lower ring member 74 which serves as a support ring. Thus, the outer peripheral surface of the upper or seal ring member 70 contacts the confronting surface of the outer tube 14 when the annulus 24' is fully inflated. The lower or support ring member 74 expands with the annulus 24' but is sized such that the outer peripheral surface thereof is adjacent the confronting surface of the outer tube 14 when the annulus 24' is fully inflated. Thus, the lower or support ring member 74 serves to provide additional support to the upper or seal ring member 70 to thereby resist collapsing of the seal ring member by the pressure acting on it.

Both the upper or seal ring member 70 and lower or support ring member 74 are secured to the outer face of annulus 24' as by vulcanizing or by using a suitable adhesive. As with the embodiment of FIGS. 1 and 2, the ring members 70 and 74 are preferably detachably secured to annulus 24' so that either of the ring members may be easily replaced. However, only the upper or seal ring member 70 need be detachable from the annulus 24' since that ring will be most likely replaced because only it makes contact with the outer tube 14 and would be subject to wear or damage when the outer tube is moved without deflating annulus 24'. Since only the thinner upper ring member 70 would require replacement, costs will be reduced over replacing an entire seal member 24' as would be the case in the embodiment of FIGS. 1 and 2.

Although the sealing device of this invention has been described as being used with concentric telescoping reciprocating members, it is noted that the device is useable with eccentrically telescoping members, fixed bodies, one arranged within the confines of the other, or with concentric bodies rotatable with respect to each other. As an example of another application of this invention, the door shown in FIGS. 4, 5, and 8 of the earlier mentioned Bosetti et al. patent could be fitted with the sealing device of this invention. Also, it is noted that the sealing device as described hereinabove would be equally effective regardless of which tube, inner or outer, fixed or movable, it was mounted on. In other words, the sealing device could be mounted on an outer tube fixed with respect to a movable inner tube, or on an outer tube movable with respect to a fixed inner tube, and so on.

It should be apparent now that the sealing device of this invention has distinct advantages over the old type inflatable seal. The thin portion of sealing device, being entirely received within the channel of the seal housing, is protected against severe damage by the movement of the ducts even when it is inflated; the channel arrangement of the seal housing permits a more massive sealing member than was possible with the old seals and thereby results in a stronger seal having greater resistance to collapse under pressure; the massive sealing member also provides a larger sealing contact surface and thus a more effective seal. The replaceability advantages of this invention were noted earlier, together with other advantages.

While I have shown and described certain present preferred embodiments of the present invention it is to be distinctly understood that the invention is not limited thereto but may be otherwise variously embodied within the scope of the following claims.

I claim:

1. In a structure including inner and outer generally concentrically positioned members with generally parallel confronting surfaces, one of said members having an annular expansible packing-receiving channel thereon, the invention comprising a sealing device contained in said channel having:
   an expansible annulus entirely contained within the channel and sized and shaped to sealably engage said channel when it is expanded;
   fluid pressure means for selectively supplying fluid under pressure to said annulus; and
   radially yieldable annular sealing means fitted in the channel around said expansible annulus said annular sealing means having an original position wherein it is retracted substantially completely within said channel and a sealing position wherein the outer peripheral surface of said sealing means is radially extended from said channel into sealing engagement with the confronting surface of the second concentrically positioned member through expansion of said annulus, said sealing means being constructed and arranged such that it will return to said original position and collapse said annulus when the pressure on said annulus is relieved.

2. The sealing device as set forth in claim 1 wherein said expansible annulus is a tubular member.

3. The sealing device as set forth in claim 1 wherein substantially the entire said outer peripheral surface of said sealing means is a sealing surface for contacting said confronting surface.

4. The sealing device as set forth in claim 1 wherein said sealing means is formed of an elastic non-metallic material.

5. The sealing device as set forth in claim 1 wherein said sealing means includes a pair of axially abutting ring members, both of which are formed of elastic non-metallic material, the outer peripheral surface of one of said ring members comprising a sealing surface for contacting said confronting surface when said annulus is expanded, the other ring member being sized such that its outer peripheral surface is adjacent said confronting surface when said annulus is expanded, and said other ring member being stronger than said one ring member.

6. The sealing device as set forth in claim 1 including suction means for selectively drawing a vacuum on said annulus.

7. Apparatus for forming a seal between the confronting surfaces of a pair of bodies, one disposed at least partially within the confines of and spaced from the inner wall of the other, said apparatus comprising:

a housing member secured to one of said bodies and having an annular channel with one of its radial ends open and facing said confronting surface of the other body;

retractable and extensible sealing means contained within said channel and movable toward and away from the other of the bodies, said sealing means having an inner inflatable annular member entirely contained within said channel and sized and shaped to sealably engage said channel when said sealing means is extended, said sealing means further having a solid yieldable elastic outer section with a radial width which exceeds the width of the space between said housing and said other body and with the outer peripheral surface of the outer section having a sealing surface for contacting in sealing engagement said confronting surface of said other body when said sealing means is extended; and pressure means for selectively extending said sealing means to effect sealing contact with said confronting surface of said other body, said annular outer section having elastic properties such that it will retract substantially completely into said channel when the pressure on said sealing means is relieved.

8. The apparatus as set forth in claim 7 wherein said outer section of said sealing means is a radially yieldable ring means formed of an elastic non-metallic material.

9. The apparatus as set forth in claim 7 wherein said inner annular section is an expansible tubular member.

10. The apparatus as set forth in claim 7 wherein substantially the entire outer peripheral surface of the outer section is a sealing surface for contacting confronting surface of said other body.

11. The apparatus as set forth in claim 7 wherein said outer section includes a pair of abutting ring members both of which are formed of elastic non-metallic material, the outer peripheral surface of one of the ring members comprising a sealing surface for contacting said confronting surface of said other body when said sealing means is extended, the other ring member being sized such that its outer peripheral surface is adjacent said confronting surface of said other body when said sealing means is extended, and said other ring member being stronger than said one ring member.

12. The apparatus as set forth in claim 7 wherein said outer annular section is detachable from the remainder of said sealing means.

13. The apparatus as set forth in claim 7 including means for retracting said sealing means into its original position from its sealing contact with said confronting surface of said other body.

* * * * *